(12) United States Patent
Barry (10) Patent No.: US 8,869,964 B2
(45) Date of Patent: Oct. 28, 2014

(54) SYSTEMS AND METHODS FOR DISENGAGING AND ENGAGING A WRAP SPRING CLUTCH

(75) Inventor: Alan F. Barry, Lincoln, NE (US)

(73) Assignee: Raven Industries, Inc., Sioux Falls, SD (US)

( * ) Notice: Subject to any disclaimer, the term of this patent is extended or adjusted under 35 U.S.C. 154(b) by 533 days.

(21) Appl. No.: 13/028,312

(22) Filed: Feb. 16, 2011

(65) Prior Publication Data

US 2011/0198184 A1 Aug. 18, 2011

Related U.S. Application Data

(60) Provisional application No. 61/305,243, filed on Feb. 17, 2010.

(51) Int. Cl.
*F16D 13/08* (2006.01)
*F16D 13/02* (2006.01)

(52) U.S. Cl.
CPC .................................. *F16D 13/025* (2013.01)
USPC .......................... 192/81 C; 192/23; 192/84.81

(58) Field of Classification Search
USPC ................................ 192/23, 26, 81 C, 84.81
See application file for complete search history.

(56) References Cited

U.S. PATENT DOCUMENTS

| | | |
|---|---|---|
| 1,615,502 A | 1/1927 | Bourn |
| 2,829,748 A | 4/1958 | Sacchini et al. |
| 3,111,822 A | 11/1963 | Hansen |
| 3,159,256 A | 12/1964 | Welsh et al. |
| 3,232,399 A * | 2/1966 | Harned et al. ............. 192/103 R |
| 3,304,793 A | 2/1967 | Nishimura |
| 3,335,835 A | 8/1967 | Conlon |
| 3,412,617 A | 11/1968 | Holzer |
| 3,570,639 A | 3/1971 | Fredell et al. |
| 4,321,992 A | 3/1982 | Gallo |
| 4,432,675 A | 2/1984 | Machnee |
| 4,462,013 A | 7/1984 | Ueda et al. |
| 4,550,860 A | 11/1985 | Weeder |
| 4,570,768 A | 2/1986 | Nishimura et al. |
| 4,758,811 A | 7/1988 | Slavin et al. |
| 5,003,894 A | 4/1991 | Lafferty |

(Continued)

FOREIGN PATENT DOCUMENTS

| | | |
|---|---|---|
| WO | WO 03/077407 | 9/2003 |
| WO | WO-03077407 A2 | 9/2003 |
| WO | WO 2008/044058 | 4/2008 |

OTHER PUBLICATIONS

International Search Report from related PCT application No. PCT/US2011/025168, dated Apr. 25, 2011.

(Continued)

*Primary Examiner* — David D Le
*Assistant Examiner* — Stacey Fluhart
(74) *Attorney, Agent, or Firm* — Schwegman, Lundberg & Woessner, P.A.

(57) ABSTRACT

The invention provides a system, device and method for using a rotary actuator, e.g., a stepper motor to actuate a wrap spring clutch. Feedback from a system of sensors and GPS data, including rotational speed, travel speed and direction are provided to improve the reaction accuracy of the clutch. In one embodiment, a plurality of actuator controllers are connected in a configuration wherein one controller is a "master" and the remaining controllers are "slaves" to provide a higher level of machine control.

29 Claims, 9 Drawing Sheets

(56) References Cited

U.S. PATENT DOCUMENTS

| | | | |
|---|---|---|---|
| 5,078,066 A | 1/1992 | Lafferty | |
| 5,251,735 A | 10/1993 | Lamoureux | |
| 5,318,161 A | 6/1994 | Lyga | |
| 5,335,760 A | 8/1994 | Leone | |
| 5,954,178 A * | 9/1999 | Fischer et al. | 192/90 |
| 6,091,997 A | 7/2000 | Flamme et al. | |
| 6,113,021 A * | 9/2000 | Hosokawa | 242/356.6 |
| 6,116,797 A | 9/2000 | Brewington et al. | |
| 6,119,841 A | 9/2000 | Orlamunder | |
| 6,240,861 B1 | 6/2001 | Memory | |
| 6,247,569 B1 | 6/2001 | McGuire et al. | |
| 6,305,303 B1 | 10/2001 | Wright et al. | |
| 6,484,861 B1 | 11/2002 | Wussow | |
| 6,695,112 B1 | 2/2004 | Webber | |
| 7,080,936 B1 | 7/2006 | Simpson | |
| 7,273,016 B2 | 9/2007 | Landphair et al. | |
| 7,374,029 B1 | 5/2008 | Dillman | |
| 7,374,030 B1 | 5/2008 | Dillman | |
| 7,497,176 B2 | 3/2009 | Dillman | |
| 7,571,688 B1 | 8/2009 | Friestad et al. | |
| 7,661,516 B2 | 2/2010 | Dillman | |
| 7,661,517 B2 | 2/2010 | Dillman | |
| 7,857,309 B2 | 12/2010 | Moore | |
| 8,140,223 B2 * | 3/2012 | Whitehead et al. | 701/41 |
| 2007/0151492 A1 | 7/2007 | Dillman | |
| 2007/0151824 A1 | 7/2007 | Dillman | |
| 2007/0181399 A1 | 8/2007 | Ackermann et al. | |
| 2008/0156239 A1 | 7/2008 | Dillman | |
| 2009/0032362 A1 | 2/2009 | Nickel et al. | |
| 2009/0090283 A1 | 4/2009 | Riewerts | |
| 2009/0266279 A1 | 10/2009 | Dillman | |
| 2009/0272615 A1 | 11/2009 | Buzzard | |
| 2010/0162931 A1 | 7/2010 | Cannon et al. | |
| 2013/0175133 A1 | 7/2013 | Wagers | |

OTHER PUBLICATIONS

"U.S. Appl. No. 13/491,406, Preliminary Amendment filed Aug. 23, 2012", 6 pgs.

"Canadian Application Serial No. 2,790,126, Voluntary Amendment filed Aug. 15, 2012", 10 pgs.

"International Application Serial No. PCT/US2011/025168, International Preliminary Report on Patentability mailed Aug. 21, 2012", 15 pgs.

"International Application Serial No. PCT/US2011/025168, International Search Report mailed Apr. 25, 2011", 2 pgs.

"International Application Serial No. PCT/US2011/025168, Preliminary Report on Patentability mailed Aug. 30, 2012", 16 pgs.

"International Application Serial No. PCT/US2011/025168, Written Opinion mailed Apr. 25, 2011", 14 pgs.

"Wrap Spring Products", [Online]. Retrieved from the Internet: <URL: http://www.idicb.com/dynacorp/PDF/Reference/Dynacorp-Ref-WrapSpring.pdf>, (Published prior to Jun. 7, 2012), 2 pgs.

Trenor, Clint, et al., "Clutch Designs for Equipment Controls Optimization", Design News, [Online]. Retrieved from the Internet: <URL: http://www.designnews.com/document.asp?doc_id=229772&dfpPParams=i . . . >, (Dec. 1, 2010), 7 pgs.

U.S. Appl. No. 13/491,406, Non Final Office Action mailed Apr. 2, 2014, 10 pgs.

U.S. Appl. No. 13/491,406, Response filed Jul. 31, 2014 to Non Final Office Action mailed Apr. 2, 2014, 15 pgs.

\* cited by examiner

Fig. 9

SYSTEMS AND METHODS FOR DISENGAGING AND ENGAGING A WRAP SPRING CLUTCH

BACKGROUND OF THE INVENTION

1. Field of the Invention

The invention relates generally to systems, devices and methods for disengaging and engaging a wrap spring clutch. More particularly, the invention relates to actuators for a spring wrap clutch used in agricultural row crop planters.

2. Description of the Related Art

The seed delivery mechanisms used on row crop planters are commonly powered from a single source. This source may be a ground-driven tire and transmission combination that maintains a seeding rate regardless of travel speed or a powered drive such as a hydraulic drive system that uses sensors to measure the travel speed and a central control unit that causes the motor to turn at the correct rate to plant at the desired seeding rate.

In either case, individual control of seed meters is not possible. All of the seeding units powered by the drive mechanism are planting, or all of the seeding units are not planting. Various methods evolved to provide some level of control over the seeding mechanisms on groups of individual rows and ultimately individual rows.

One of the most common ways to control individual rows or groups of rows is with a mechanical clutch. One of the most commonly used mechanical clutches is a wrap spring clutch. With such a clutch, a small amount of power can be used to instantly engage, hold, and disengage the rotating mechanisms used to singulate the seeds and deposit them in the furrow. Wrap spring clutches use a pair of hubs or drive shafts, an uncontrolled input drive shaft in operative connection with a first clutch plate and an output drive shaft in operative connection with a second clutch plate. A torsion spring is compressed against and wrapped around a portion of the first and second clutch plates, the torsion wrap spring comprising an actuable tang positioned radially outwardly from the wrapped torsion spring. The tang may be engaged in a release collar. Rotating power supplied to the input drive shaft causes the spring to wrap tightly around the first clutch plate to the second clutch plate through friction. If an obstacle stops the rotation of the release collar, the tang is actuated, stops rotating and the spring consequently unwinds, releasing the friction between the spring and the first clutch plate. When this occurs, the input drive shaft and first clutch plate rotate freely while the wrap spring, second clutch plate and output drive shaft cease rotating. When the obstacle is removed from the release collar, disengaging the tang, the spring begins to wind, rotating with the input drive shaft and first clutch plate, friction increases rapidly until the second clutch plate and output drive shaft are rotating with the first clutch plate and input drive shaft as a single unit.

Typically, clutches are actuated either mechanically, pneumatically, e.g., with a compressed air cylinder, electrically, e.g., with a solenoid or the like. In some systems, particularly low current systems, the amount of current required to actuate the clutch limits the number of clutches that may be incorporated into the system. In both the systems using an electrical solenoid or a compressed air cylinder, a force is applied in one direction and a return spring creates the opposing force to cause the clutch mechanism to return to its normal state. This requires the actuating device to move with sufficient force to engage the tang by, e.g., stopping the release collar, and overcoming the return spring. The return spring must have enough compressed force to overcome friction and move the actuator away from the release collar. Large amounts of electrical power or compressed air are required to ensure consistent operation of the device.

For example, for a typical planter, a solenoid requires approximately 30 amps to pull a piston to engage a release ring, and approximately 1 amp to hold the piston in engagement. Consequently, because the electrically system is limited in capacity, one clutch is used to activate several corn planter assemblies.

Early planters placed such actuation devices in a common place on the driveline of the planter so that, when actuated, planting activity would cease on ½, ⅓ or ¼ of the whole machine. A single clutch controlled a group of rows. In this application, power demand was not a concern as only one or two clutch mechanisms were powered at a time. Later, as Global Positioning System ("GPS") control became more common, seed costs began rising and farming practices changed, the demand to place a clutch on each row became more common. Power usage became a concern.

The accuracy of GPS control of individual row clutches became a concern. Typical agricultural systems used in this application may not have the ability to start and stop individual rows accurately. For example, an outside row may be planting 30 inches from a previous planting pass. If the machine drifts too closely to the previous planting pass, then the GPS control system may interpret its information to conclude this row unit has passed into previously planted area and cause it to stop dropping seeds. This results in an unwanted skip in the row.

To overcome this problem, most planters have the individual row clutches tied together in groups of 2, 3 or more. When the GPS control unit sends the signal to disengage the drive, all the row units in that group stop planting at the same time. This moves the distance from pass to pass farther away, preventing unwanted shutoff, but it can also result in less than perfect operation in other aspects and circumstances. For example, consider the case where a group of 3 row units are tied to the same control signal and clutch mechanism. If this group enters a previously planted area at, e.g., an acute angle, one row will stop planting too early leaving an unplanted portion of the row, one row unit will stop at the correct place in the row and the third row unite will continue to plant into the previously planted area, thereby wasting seed and reducing yields from over population.

The present invention overcomes these deficiencies.

BRIEF SUMMARY OF THE INVENTION

The invention provides a system, device and method for using a rotary actuator, e.g., a stepper motor to actuate a wrap spring clutch. Feedback from a system of sensors and GPS data, including rotational speed, travel speed and direction are provided to improve the reaction accuracy of the clutch. In one embodiment, a plurality of actuator controllers are connected in a configuration wherein one controller is a "master" and the remaining controllers are "slaves" to provide a higher level of machine control.

The figures and the detailed description which follow more particularly exemplify these and other embodiments of the invention.

BRIEF DESCRIPTION OF THE DRAWINGS

The invention may be more completely understood in consideration of the following detailed description of various embodiments of the invention in connection with the accompanying drawings, which are as follows.

DETAILED DESCRIPTION OF THE INVENTION, INCLUDING THE BEST MODE

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention.

With reference to the FIGS. 1, and 2A-2C, one embodiment of a wrap spring clutch assembly 100 is illustrated. An input drive shaft 20 is provided in operative connection with a first clutch plate 22. The input drive shaft 20 is uncontrolled as is commonly known in the art. An output drive shaft 24 is provided in operative connection with a second clutch plate 26. The first and second clutch plates 22 and 26 are in operative position with respect to each other, as illustrated adjacent one another.

A torsion wrap spring 28 is compressed against and wrapped around a portion of the first and second clutch plates 22, 26, the torsion wrap spring 28 comprising a tang 30 projecting radially outwardly from the torsion wrap spring 28. A control sleeve 31 is illustrated in dashed lines, the control sleeve 31 capable of engaging tang 30 as is well known in the art.

A stepper motor actuator assembly 32 comprising stepper motor 33 is disposed proximal the tang 30. Generally, a stepper motor 33 is preferred, though any rotary motor may be used in various other embodiments of the present invention. The stepper motor 33 comprises a gear reduction mechanism (not shown) for reducing speed of stepper motor 33 and a rotating axle 34 which rotates in response to the actuation of stepper motor 33. In some embodiments, the gear reduction mechanism is not used, instead a direct connection is made to the motor 33. An eccentric 36 is operatively connected with rotating axle 34 at a point that is offset from the center of eccentric 36. Eccentric 36 is in operative connection with a mechanical link 38. Mechanical link 38 is, in turn, operatively connected with plunger 40.

When stepper motor 33 is actuated, the actuator motor assembly 32 provides 360 degrees of rotational motion for the eccentric 36. The mechanical link 38 and plunger 40 are translated linearly accordingly, as the off center axle 34 of the eccentric 36 provides a mechanism for transforming the rotational motion of the eccentric 36 into translational linear motion. Thus, the plunger 40 has a translational linear position corresponding with each rotational position of the eccentric 36.

Figure 1:
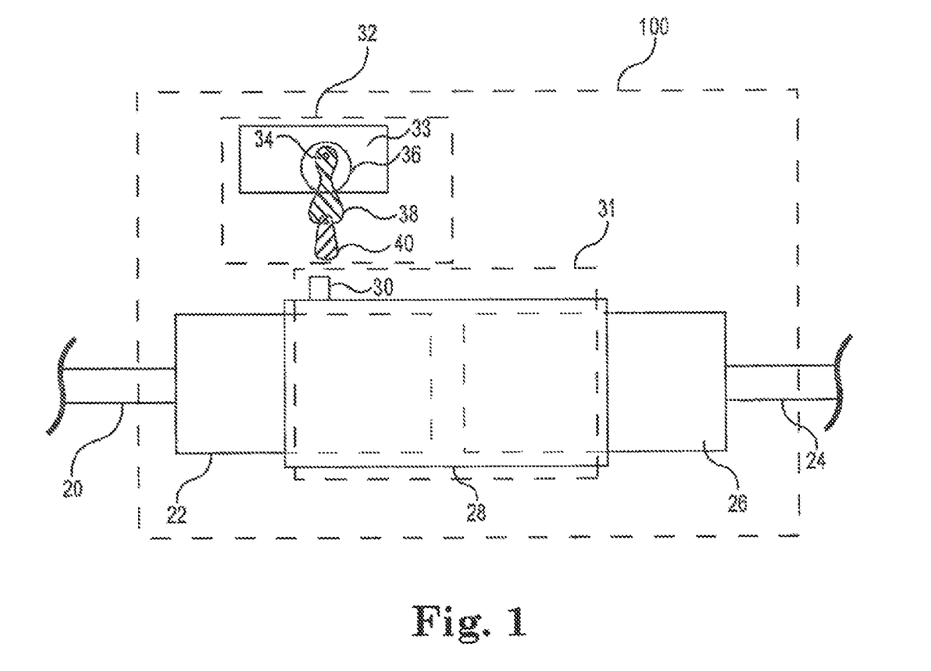
FIG. 1 is a side view of one embodiment of the wrap spring clutch assembly of the present invention.

In certain rotational positions of the eccentric 36, and therefore in the corresponding translational position of the plunger 40, plunger 40 will not engage the control sleeve 31 and, therefore, will not engage the tang 30. The position of the eccentric 36 in FIG. 1 is illustrated as 0 degrees of rotational motion, i.e., located at the top most rotational position of the eccentric 36. This position, as illustrated, results in a gap between the plunger and the control sleeve 31 and the tang 30 is not engaged.

Figure 2A:
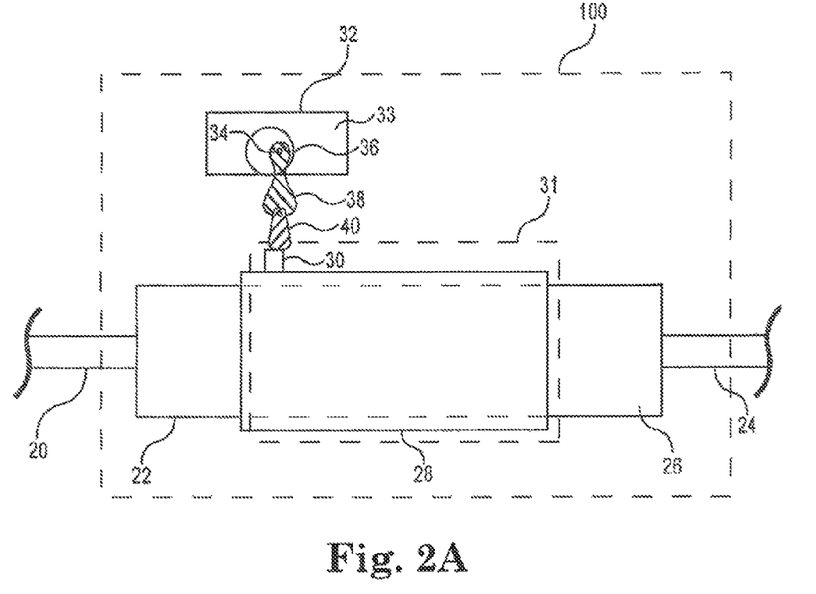
FIG. 2A is a side view of one embodiment of the wrap spring clutch assembly of the present invention.
Figure 2B:
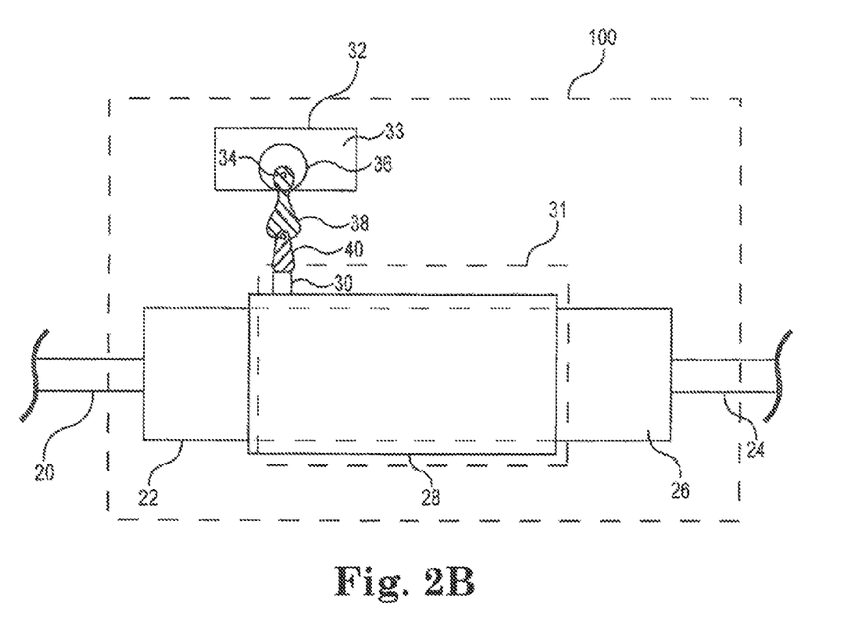
FIG. 2B is a side view of one embodiment of the wrap spring clutch assembly of the present invention.
Figure 2C:
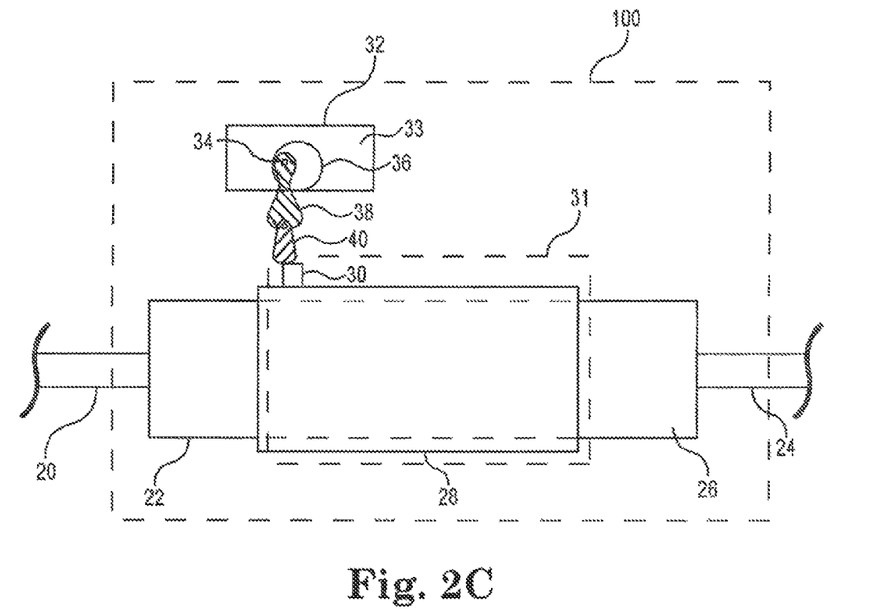
FIG. 2C is a side view of one embodiment of the wrap spring clutch assembly of the present invention.

FIGS. 2A-2C illustrate other rotational positions of the eccentric 36 and the corresponding translational positions of the plunger 40. FIG. 2A illustrates the eccentric 36 stopped at rotational position of 90 degrees, with the plunger 40 at its corresponding translational position. In this case, the rotational position of 90 degrees results in the engagement of the tang 30 with plunger 40, via the control sleeve 31. FIG. 2B illustrates the eccentric 36 stopped at rotational position of 180 degrees, its lowest point of rotation, with the plunger 40 at its corresponding lowest translational position. In this case, the rotational position of 90 degrees results in the engagement of the tang 30 with plunger 40, via the control sleeve 31. FIG. 2C illustrates the eccentric 36 stopped at rotational position of 270 degrees, with the plunger 40 at its corresponding translational position. In this case, the rotational position of 270 degrees results in the engagement of the tang 30 with plunger 40, via the control sleeve 31.

Thus, in the illustrated embodiment, any rotational position of the eccentric 36 from 90 degrees to 270 degrees will engage the plunger 40 with the tang 30, via the control sleeve 31. Any rotational position of the eccentric 36 within the range of 271 degrees to 89 degrees will result in no engagement between the plunger 40 and the tang 30 via control sleeve 31. Clearly, these are exemplary embodiments and a variety of modifications may be made to alter the rotational positions and engagement ranges thereof by, e.g., changing the dimensions of the eccentric 36, the axle 34 positioning thereon, the lengths and/or widths of the mechanical link 38 and/or plunger 40. Any of these modifications are equivalents within the scope of the present invention.

Figure 3:
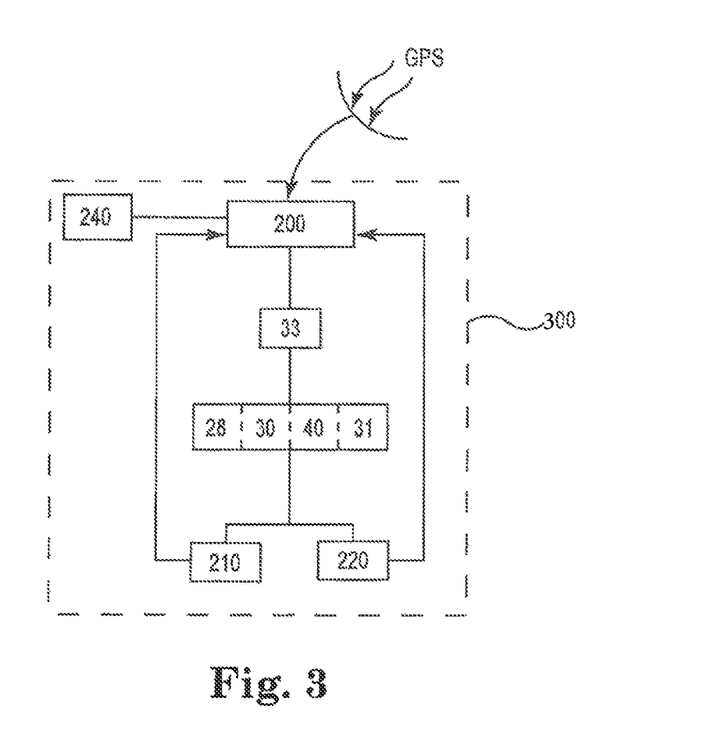
FIG. 3 is a block diagram illustrating one embodiment of the present invention.

A stepper motor controller 200 may be provided as shown in control system 300 in FIG. 3, to provide control instructions to the stepper motor 33 as well as accept and process feedback data from sensors 210, 220 in controlling the assembly 100. For example, a first sensor 210 may be in operative communication with the stepper motor controller 200 for measuring the rotational position data of the eccentric 36, wherein the measured rotational position data is communicated back to the stepper motor controller 200 for processing. The first sensor 210 may further measure rotational speed of the output drive shaft 24 and communicate the rotational speed data back to the stepper motor controller 200. A second sensor 220 in operative communication with the stepper motor controller 200 may measure the rotational speed of the input drive shaft 20, communicating the rotational speed data back to the stepper motor controller 200.

Moreover, the stepper motor controller 200 may be in communication with a GPS satellite and system 230, deriving location, position, and directional data therefrom. Stepper motor 33 thus receives activation instruction from stepper motor controller 200 and acts to engage or disengage the tang 30 on the torsion wrap spring 28 via control sleeve 31 as discussed supra.

Stepper motor controller 200 may be programmed to engage the plunger 40 with the tang 30, via control sleeve 31 for a predetermined number of revolutions, or portion of a revolution, of the output hub 24 or control sleeve 31. Moreover, stepper motor controller 200 may utilize the measured rotational speed and rotational position data for determining when to engage the tang 30 with the plunger 40 via control sleeve 31, and when to disengage the tang 30 from the plunger 40 via control sleeve 31.

Thus, the stepper motor controller 200 may control the rotation of the eccentric 36 by controlling the actuation, i.e., the rotation, of the stepper motor 33. Thus, the plunger 40 that engages or disengages tang 30 via release collar 31 may be positioned to engage the release collar 31, thereby engaging the tang 30 with a minimum of movement, followed by a full release. The cycle may be 90 degrees of rotation of the eccentric 36 to translationally position the plunger 40 to engage tang 30 via stop collar 31, e.g., from 0 degrees as in FIG. 1 to 90 degrees as in FIG. 2A. This engagement may be disengaged by rotating the eccentric 36 to translate the plunger 40 away from tang 30 via stop collar 31. This disengagement may be achieved by reversing the eccentric 36, i.e., from a rotational position of 90 degrees (engagement) to a rotational position between, e.g., 90 degrees and 0 degrees. Alternatively, reversal of the eccentric 36 from 90 degree position as in FIG. 2A will result in disengagement of the plunger 40 and tang 30 via release collar 31 if the eccentric 36 is positioned anywhere between 270 degrees and 90 degrees. Still more alternatively, continuing the rotation of eccentric 36 from 90 degrees to 271 degrees, or any other rotational position between 270 and 90 degrees will disengage plunger 40 from tang 30 via release collar 31.

One particular embodiment combines alternating short and long cycles. Thus, 90 degrees of rotation from 0 degrees engages the plunger 40 with tang 30 via release collar, followed by 270 degrees of rotation, from rotational position 90 degrees, places the rotational position back at 0 degrees, where the plunger 40 is disengaged from tang 30 via release collar.

Alternatively, as discussed above, the stepper motor 33 may hold position and instantly change direction, thereby instantly changing the rotational position of eccentric 36 and translational position of plunger 40. This could be achieved with a minimum of rotational movement of eccentric 36 by, e.g., rotationally translating eccentric 36 to 90 degrees to engage plunger 40 with tang 30, then reversing direction of the rotation of eccentric 36 from 90 degrees to 89 degrees, e.g., to disengage the plunger 40 from tang 30 via release of release collar 31. In the illustrated embodiment, the disengagement of plunger 40 from tang 30 comprises rotational positions between 270 and 0 degrees as well as between 0 degrees and 90 degrees. Engagement of plunger 40 from tang 30 comprises rotational positions from 90 degrees to 270 degrees. The skilled artisan will readily recognize a number of alternative ways to design a rotational cycle using the present invention, each of which is within the scope of the present invention.

A power buss 240 may be provided for providing continuous power to the stepper motor controller 200 and the stepper motor 33. The stepper motor 33 may thus be controlled by application of a pulse modulated signal to further enhance the control of the individual wrap spring clutch assemblies 100. For example, a low frequency pulse rate could cause the assembly to actuate in 10 revolutions of the output hub 24 or release collar 31; a medium frequency pulse rate could cause the assembly to actuate in 5 revolutions of the output hub 24 or release collar 31; and a high frequency pulse rate could cause the assembly to actuate in 1 revolution of the output hub 24 or release collar.

Figure 4:
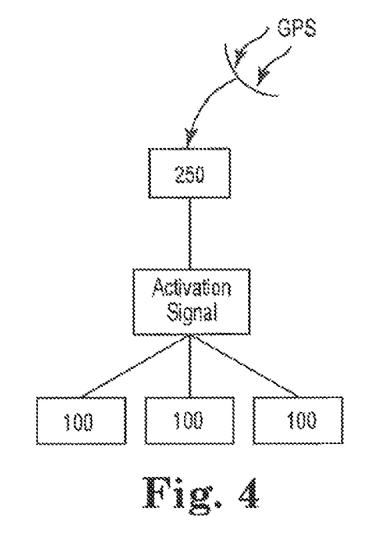
FIG. 4 is a block flow diagram illustrating one embodiment of the present invention.
Figure 5:
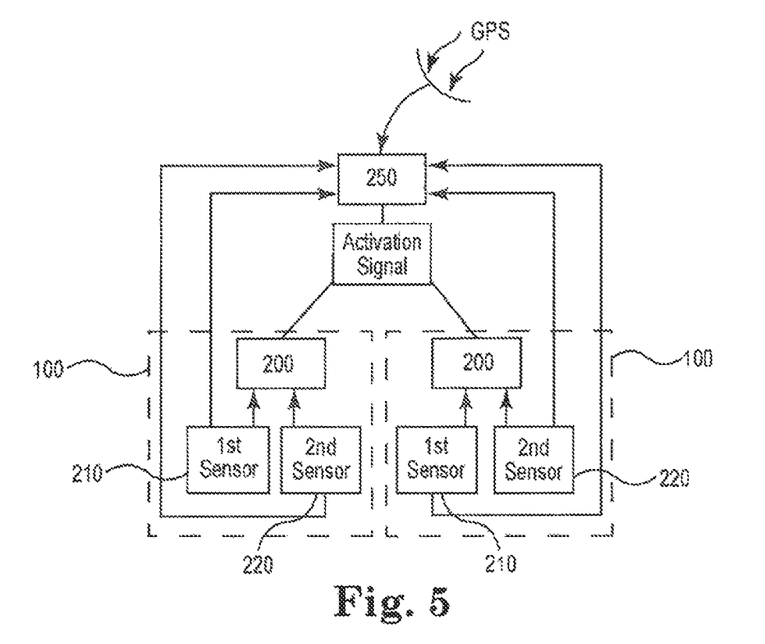
FIG. 5 is a block flow diagram illustrating one embodiment of the present invention.

A greater degree of machine control may be achieved through use and application of a master stepper motor controller, or master control unit 250 in operative connection with one or more wrap spring assemblies 100, specifically, the master control unit 250 may be in operative communication with one or more of the stepper motor controllers 200 as illustrated in FIGS. 4 and 5. Further, the master control unit 250 may be in operative communication with the GPS system 230, obtaining input data for determining specific location, directional angle, and travel speed. The master control unit 250 may also be in operative communication with the first sensor 210 discussed above which measures rotational speed of the output drive shaft 24 and communicate the rotational speed data back to the master control unit 250. The master control unit may be in further operative communication with the second sensor 210 described above and which measures the rotational speed of the input drive shaft 20, communicating the rotational speed data back to the master control unit 250. The sensors 210, 220 may further measure the rotational position of the eccentric 36 and communicate the rotational position back to the master control unit 250.

Figure 6:
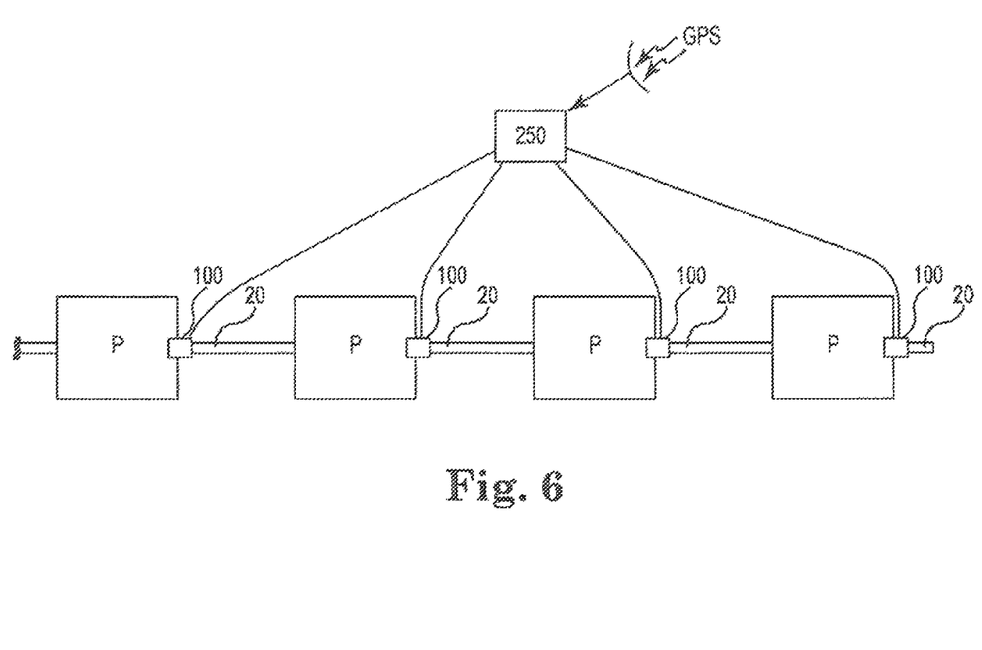
FIG. 6 is a block diagram illustrating one embodiment of the present invention.

Turning now to FIG. 6, a series of mechanical interfaces, e.g., planters P, is provided, illustrating control of same using the wrap spring clutch assembly 100 of the present invention. Uncontrolled input drive 20 is provided to each planter P. The input drive 20 communicates with the wrap spring assemblies 100, which are in operative communication with the master control unit 250. As described in connection with FIGS. 4 and 5, the master control unit 250 controls the actuation of each assembly and receives the described feedback from first and second sensors 210, 220 and input date from the GPS system.

Figure 7:
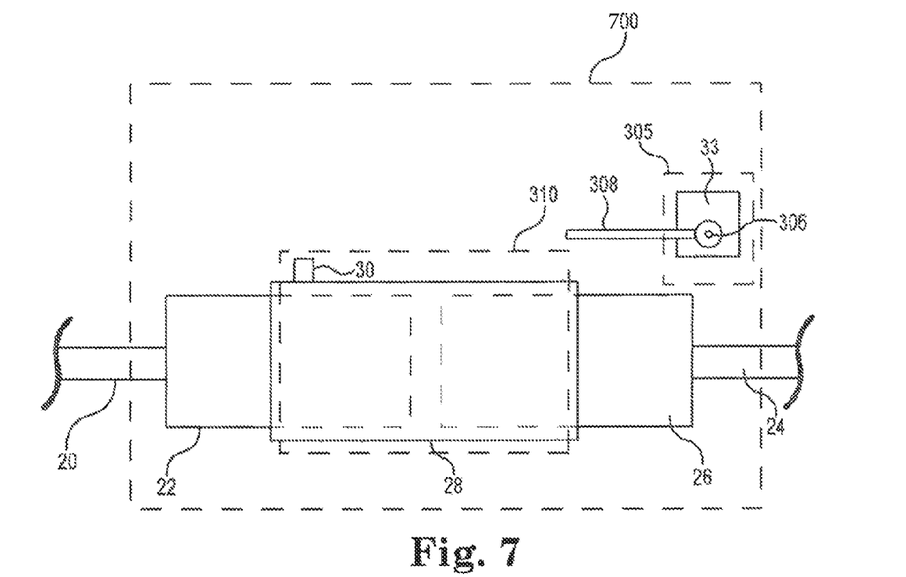
FIG. 7 is a side view of one embodiment of the present invention.
Figure 8A:
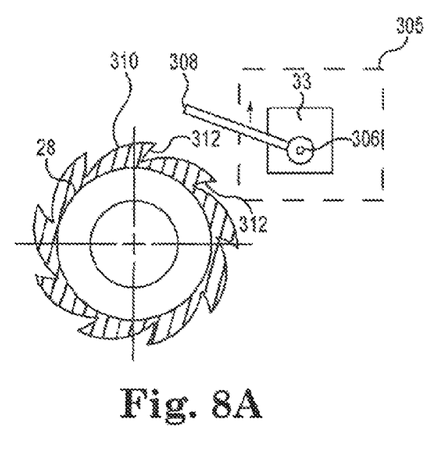
FIG. 8A is an end and partial cutaway view of one embodiment of the present invention.
Figure 8B:
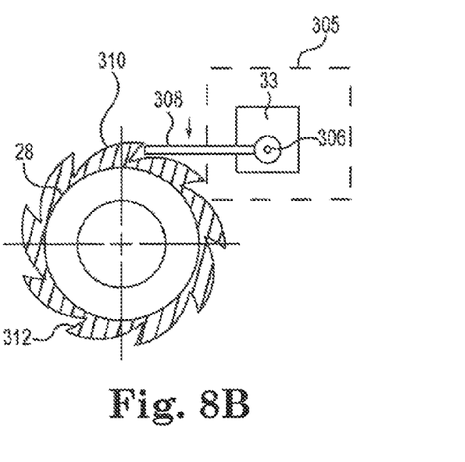
FIG. 8B is an end and partial cutaway view of one embodiment of the present invention.

FIGS. 7 and 8A-8B illustrate an alternate embodiment comprising wrap spring assembly 700. Assembly 700 comprises a rotary motor or, as shown a stepper motor assembly 305 comprising a stepper motor 33, or alternately a rotor motor, that is in operative rotatable communication with motor shaft 306 which comprises a rotating shaft in operative connection with a stop lever 308, whereby rotational motion of the shaft 306 is transformed into linear translational motion by the stop lever 308. The wrap spring clutch assembly 700 further comprises, as described supra, an input drive shaft 20 in operative connection with a first clutch plate 22. The input drive shaft 20 is uncontrolled as is commonly known in the art. An output drive shaft 24 is provided in operative connection with a second clutch plate 26. The first and second clutch plates 22 and 26 are in operative position with respect to each other, as illustrated adjacent one another.

A torsion wrap spring 28 is compressed against and wrapped around a portion of the first and second clutch plates 22, 26, the torsion wrap spring 28 comprising a tang 30 projecting radially outwardly from the torsion wrap spring 28. A control sleeve 310 is illustrated in dashed lines, the control sleeve 310 capable of engaging and disengaging tang 30 as is well known in the art.

FIGS. 8A and 8B illustrate an end view of one embodiment of the control sleeve 310 of the present invention in operative communication with stepper motor assembly 305. As illustrated, motor shaft 306 is in communication with stop lever 308. Rotation of motor shaft 306 in a clockwise direction as illustrated may, as in FIG. 8A, raise the stop lever 308 out of engagement with control sleeve 310. As illustrated in FIG.

8B, rotation of motor shaft 306 in a counterclockwise direction as illustrated, may lower the stop lever 308 from the position of disengagement with control sleeve 310 of FIG. 8A, into a position of engagement with control sleeve 310. Control sleeve 310 in this embodiment comprises a series of radial catches 312, arranged around wrap spring 28. Lowering stop lever 308 engages one of radial catches 312 in the position of engagement between stop lever 308 and control sleeve 310.

Figure 9:
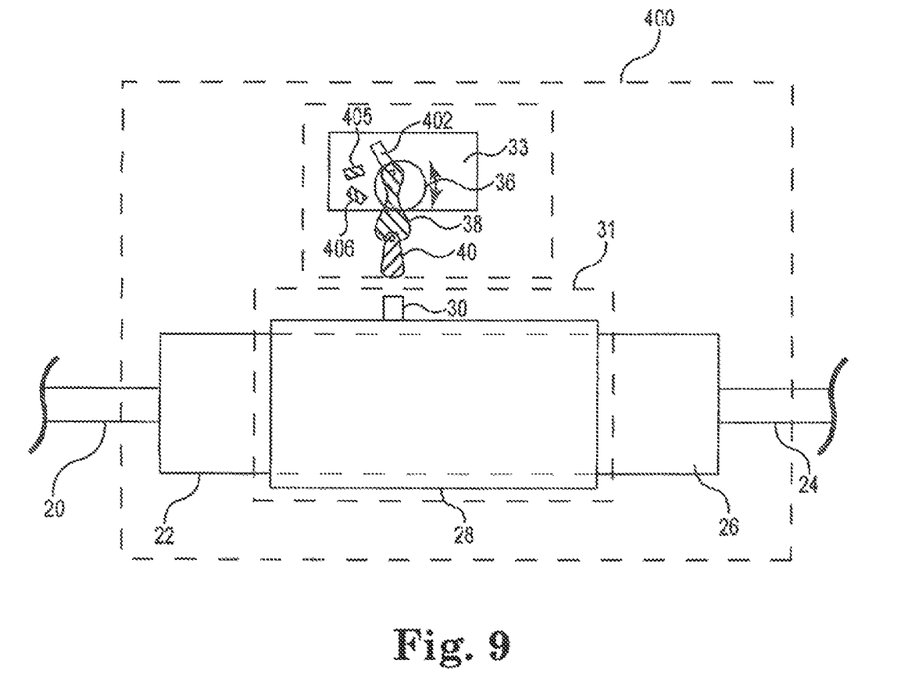
FIG. 9 is a side view of one embodiment of the present invention.

Turning now to FIG. 9, another embodiment of the present invention is provided. As illustrated in FIG. 1, wrap spring clutch assembly 400 comprises stepper motor assembly 32 having a stepper motor 33, alternatively a rotor motor may be used, an eccentric 36 in operative communication with a mechanical link 38 and plunger 40 for engaging tang 30 via control sleeve 31. Eccentric 36 further comprises a stop arm 402 which extends radially from eccentric 36 and which is it rotatable connection with eccentric 36. Assembly 400 further comprises an upper stop 405 and a lower stop 406, which may be disposed on stepper motor 33 or in alternative connection locations as the skilled artisan will recognize. As illustrated rotation of eccentric 36 in a clockwise rotational direction engages lower stop 406 with stop arm 402, at a point between 180 degrees and 270 degrees of rotational position. Counterclockwise rotation of eccentric 36 results in stop arm 402 engaging upper stop 405 at a point between 180 degrees and 360/0 degrees of rotational position. Upper and lower stops 405, 406 may be positioned at any rotational position desired to bring eccentric 36 to a stop and, thereby, manipulating the engagement and disengagement of plunger 40 with tang 30 via control sleeve 31. Upper and lower stops 405, 406 are thus permanent stops, whereby when the stop arm 402 of eccentric 36 encounters the upper stop 405, plunger 40 is prevented from vertical translation unless the motor 33 rotates eccentric 36 in a clockwise rotational direction. Similarly, when stop arm 402 of eccentric 36 encounters the lower stop 406, plunger 40 is prevented from vertical translation unless motor 33 rotates eccentric 36 in a counterclockwise rotational direction.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A wrap spring clutch assembly comprising:
    an input drive shaft in operative connection with a first clutch plate;
    an output drive shaft in operative connection with a second clutch plate, wherein the first and second clutch plates are adjacent one another;
    a torsion wrap spring compressed against and wrapped around a portion of the first and second clutch plates, the torsion wrap spring comprising a tang projecting radially outwardly from the wrapped torsion wrap spring;
    a stepper motor actuator assembly comprising:
    a stepper motor;
    an eccentric comprising an off center axle, the eccentric rotationally driven by the stepper motor;
    a stop arm extending radially outwardly from the eccentric and in rotating communication with the eccentric;
    an upper stop and a lower stop in operative communication with the stop arm of the eccentric;
    a mechanical link connected with the axle of the eccentric, the mechanical link transforming the rotational driving of the eccentric into linear movement of the mechanical link;
    a plunger operatively connected with the mechanical link, the plunger translating linearly in response to the linear movement of the mechanical link, wherein engagement of the stop arm with either the upper stop or the lower stop requires a reversal of rotational direction by the eccentric to translate the plunger; and
    wherein the stepper motor actuator assembly may provide a predetermined amount of rotational motion for the eccentric, with corresponding translational positions for the plunger, whereby, the plunger may engage the tang of the torsion wrap spring in at least a first translational position and may not engage the tang of the torsion wrap spring in at least a second translational position, wherein the engagement of the tang with the plunger comprises disengagement of the torsion wrap spring from the portion of the first and second clutch plates and disengaging the output drive shaft from the input drive shaft.

2. The assembly of claim 1, wherein the at least second translational position of the plunger comprises a disengagement of the plunger with the tang of the torsion wrap spring comprising an engagement of the torsion wrap spring with the first and second clutch plates and engagement of the output drive shaft with the input drive shaft.

3. The assembly of claim 1, further comprising a stepper motor controller in operative communication and connection with the stepper motor, the stepper motor controller programmed to rotate the eccentric a number of rotational degrees to achieve a desired engagement rotational position in order to engage the tang with the plunger.

4. The assembly of claim 3, wherein the desired engagement rotational position comprises a rotational position of 90 degrees to 270 degrees.

5. The assembly of claim 4, further the stepper motor further programmed to rotate the eccentric a number of rotational degrees to achieve a desired disengagement rotational position in order to disengage the tang from the plunger.

6. The assembly of claim 5, wherein the desired disengagement rotational position comprises a rotational position of 271 degrees to 89 degrees.

7. The assembly of claim 6, wherein the stepper motor controller determines the length of time the tang is engaged with the plunger and the length of time the tang is disengaged with the plunger.

8. The assembly of claim 7, further comprising a first sensor in operative communication with the stepper motor controller for measuring the rotational position data of the eccentric, the measured rotational position data communicated back to the stepper motor controller.

9. The assembly of claim 8, the first sensor further measuring the rotational speed data of the output drive shaft, the measured rotational speed data communicated back to the stepper motor controller.

10. The assembly of claim 9, a second sensor in operative communication with the stepper motor controller for measuring the rotational speed data of the input drive shaft, the measured rotational speed data communicated back to the stepper motor controller.

11. The assembly of claim 10, further comprising a Global Positioning System ("GPS") in operative communication with the stepper motor controller.

12. The assembly of claim 11, further comprising the stepper motor controller configured to engage the plunger with the tang of the torsion wrap spring for a predetermined number of revolutions of the input drive shaft and to disengage the plunger from the tang of the torsion wrap spring for a predetermined number of revolutions of the output drive shaft.

13. The assembly of claim 11, further comprising the stepper motor controller configured to engage and disengage the plunger from the tang of the torsion wrap spring according to measured rotational speed and rotational position data.

14. The assembly of claim 3, further comprising a power buss, the power buss configured to provide continuous power to the stepper motor controller and the stepper motor and whereby a pulse width modulated signal is generated and applied to control the engagement and disengagement of the plunger and the tang of the torsion wrap spring.

15. The assembly of claim 14, wherein an output hub is driven at a rotational speed determined by the travel speed, the travel speed data provided by a Global Positioning System "GPS".

16. The assembly of claim 15, further comprising:
a first sensor configured to measure the rotational position of the eccentric and measure the rotation speed of the output drive shaft;
a second sensor configured to measure the rotational speed of the input drive shaft; and
a master control unit in operative communication with the stepper motor controller, the GPS, and the first and second sensors, wherein the master control unit controls the stepper motor controller to engage the plunger with the tang of the torsion spring and disengage the plunger from the tang of the torsion spring.

17. A system of actuator controllers for providing an improved level of machine control, comprising:
a plurality of actuable machines;
a wrap spring clutch assembly in operative connection and communication with each of the plurality of actuable machines, comprising:
an input drive shaft in operative connection with a first clutch plate;
an output drive shaft in operative connection with a clutch input hub, wherein the first and second clutch plates are adjacent one another;
a torsion wrap spring compressed against and wrapped around a portion of the first and second clutch plates, the torsion wrap spring comprising a tang positioned radially outwardly from the wrapped torsion wrap spring;
a stepper motor actuator assembly for each wrap spring clutch assembly, comprising:
an eccentric comprising an off center axle, the eccentric rotationally driven by a stepper motor of the stepper motor actuator;
a stop arm extending radially outwardly from the eccentric and in rotating communication with the eccentric;
an upper stop and a lower stop in operative communication with the stop arm of the eccentric;
a mechanical link connected with the eccentric, the mechanical link transforming the rotational driving of the eccentric into translational movement of the mechanical link;
a plunger operatively connected with the mechanical link, the plunger translating in response to the translational movement of the mechanical link, wherein engagement of the stop arm with either the upper stop or the lower stop requires a reversal of rotational direction by the eccentric to translate the plunger;
wherein the stepper motor actuator assembly may provide a predetermined amount of rotational motion for the eccentric, with a corresponding translational positions for the plunger, whereby, the plunger may engage the tang of the torsion wrap spring in at least a first translational position and may not engage the tang of the torsion wrap spring in at least a second translational position;
wherein the engagement of the tang with the plunger includes disengagement of the torsion wrap spring from the portion of the first and second clutch plates and disengaging the output drive shaft from the input drive shaft, and wherein the at least second translational position of the plunger comprises a disengagement of the plunger with the tang of the torsion wrap spring comprising an engagement of the torsion wrap spring with the first and second clutch plates and engagement of the output drive shaft with the input drive shaft;
one or more slave stepper motor controllers in operative communication and connection with the stepper motor, the stepper motor capable of rotation of the eccentric a number of rotational degrees to achieve a desired engagement rotational position in order to engage or disengage the tang with the plunger; and
a master control unit in operative communication with each slave stepper motor controller, the master control unit capable of receiving programming and sensor data and controlling each slave stepper motor controller.

18. The system of claim 17, further comprising a first sensor in operative communication with the master control unit for measuring the rotational position data of each eccentric, the measured rotational position data communicated back to the master control unit.

19. The assembly of claim 18, the first sensor configured to measure the rotational speed data of each output drive shaft, the measured rotational speed data communicated back to the master control unit.

20. The assembly of claim 19, a second sensor in operative communication with the master control unit configured for measuring the rotational speed data of each input drive shaft, the measured rotational speed data communicated back to the master control unit.

21. The assembly of claim 20, further comprising a Global Positioning System ("GPS") in operative communication with the master control unit.

22. The assembly of claim 20, further comprising the master control unit, each slave controller and each stepper motor operatively connected with a power buss, whereby a pulse width modulated signal is generated and applied to control the engagement and disengagement of the plunger and the tang of the torsion wrap spring.

23. A wrap spring clutch assembly comprising:
an input drive shaft in operative connection with a first clutch plate;
an output drive shaft in operative connection with a second clutch plate, wherein the first and second clutch plates are adjacent one another;
a torsion wrap spring compressed against and wrapped around a portion of the first and second clutch plates, the torsion wrap spring comprising a tang projecting radially outwardly from the wrapped torsion wrap spring;
an actuator assembly comprising:
a rotary motor,
an eccentric comprising an off center axle, the eccentric rotationally driven by the rotary motor;
a stop arm extending radially outwardly from the eccentric and in rotating communication with the eccentric;
an upper stop and a lower stop in operative communication with the stop arm of the eccentric;

a mechanical link connected with the axle of the eccentric, the mechanical link transforming the rotational driving of the eccentric into linear movement of the mechanical link;

a plunger operatively connected with the mechanical link, the plunger translating linearly in response to the linear movement of the mechanical link, wherein engagement of the stop arm with either the upper stop or the lower stop requires a reversal of rotational direction by the eccentric to translate the plunger; and wherein the actuator assembly may provide a predetermined amount of rotational motion for the eccentric, with a corresponding translational positions for the plunger, whereby, the plunger may engage the tang of the torsion wrap spring in at least a first translational position and may not engage the tang of the torsion wrap spring in at least a second translational position, wherein the engagement of the tang with the plunger comprises disengagement of the torsion wrap spring from portions of the first and second clutch plates and disengaging the output drive shaft from the input drive shaft.

24. The assembly of claim 23, wherein the rotary motor includes a stepper motor; and the assembly comprises a stepper motor controller in communication with the stepper motor, the stepper motor controller configured to rotate the eccentric a number of rotational degrees to achieve a desired engagement rotational position in order to engage the tang with the plunger.

25. The assembly of claim 24, further comprising a Global Positioning System (GPS) in communication with the stepper motor controller.

26. The assembly of claim 24, wherein the stepper motor controller is configured to engage the plunger with the tang of the torsion wrap spring for a predetermined number of revolutions of the input drive shaft and to disengage the plunger from the tang of the torsion wrap spring for a predetermined number of revolutions of the output drive shaft.

27. The assembly of claim 24, wherein the stepper motor controller is configured to engage and disengage the plunger with the tang according to measured rotational speed and rotational position data of one or more of the input drive shaft or the output drive shaft.

28. The assembly of claim 24, further comprising a power buss providing continuous power to the stepper motor controller and the stepper motor, and wherein a pulse width modulated signal is generated and applied to control the engagement and disengagement of the plunger and the tang of the torsion wrap spring.

29. The assembly of claim 23, wherein an output hub coupled with the output drive shaft is driven at a rotational speed determined by a travel speed, the travel speed provided by a Global Positioning System (GPS).

* * * * *